(12) United States Patent
Inoue

(10) Patent No.: US 9,032,834 B2
(45) Date of Patent: May 19, 2015

(54) STEERING DEVICE

(75) Inventor: Koji Inoue, Maebashi (JP)

(73) Assignee: NSK Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 13/059,728

(22) PCT Filed: Jun. 24, 2010

(86) PCT No.: PCT/JP2010/060743
§ 371 (c)(1),
(2), (4) Date: Feb. 18, 2011

(87) PCT Pub. No.: WO2011/001888
PCT Pub. Date: Jan. 6, 2011

(65) Prior Publication Data
US 2012/0085194 A1    Apr. 12, 2012

(30) Foreign Application Priority Data

Jun. 30, 2009    (JP) .................................. 2009-155257

(51) Int. Cl.
B62D 1/184    (2006.01)
B62D 1/185    (2006.01)

(52) U.S. Cl.
CPC ....................................... *B62D 1/185* (2013.01)

(58) Field of Classification Search
USPC ................ 74/492, 493; 280/775, 777; 384/42
See application file for complete search history.

(56) References Cited

U.S. PATENT DOCUMENTS

| | | | | |
|---|---|---|---|---|
| 2,248,755 A | * | 7/1941 | Hathorn | 411/15 |
| 2,584,636 A | * | 2/1952 | Sprinkel et al. | 74/494 |
| 3,899,937 A | * | 8/1975 | Nagazumi | 74/492 |
| 4,240,305 A | * | 12/1980 | Denaldi et al. | 74/493 |
| 4,667,529 A | * | 5/1987 | Ono et al. | 74/492 |
| 4,746,144 A | * | 5/1988 | Kulczyk | 280/777 |
| 4,989,898 A | * | 2/1991 | Yamaguchi et al. | 280/777 |
| 5,074,161 A | * | 12/1991 | Hancock | 74/492 |
| 5,330,271 A | * | 7/1994 | Moy | 384/13 |
| 5,372,082 A | * | 12/1994 | Hattori | 114/144 R |

(Continued)

FOREIGN PATENT DOCUMENTS

| | | |
|---|---|---|
| JP | 2005-075250 | 3/2005 |
| JP | 2005-335491 | 12/2005 |

(Continued)

OTHER PUBLICATIONS

Blind Rivets, Nov. 15, 2002, Penton Media, machinedesign.com/article/blind-rivets-1115.*

(Continued)

*Primary Examiner* — Justin Krause
*Assistant Examiner* — Gregory Prather
(74) *Attorney, Agent, or Firm* — Crowell & Moring LLP

(57) ABSTRACT

A steering device is provided that is capable of facilitating an assembly operation, decreasing the number of parts, and decreasing manufacturing costs. A bottom plate of a stopper is tightened to an outer curved surface of an inner column between a head section and a bulged section of a rivet body. An outside diameter of the rivet body increases to eliminate a gap between a first through-hole and a second through-hole. The stopper remains stationary even when it touches a long hole at a telescopic stroke end and repeatedly receives an impact force. The durability of the stopper improves. There is no need for a nut for fixing the stopper to the inner column. The number of parts decreases to reduce manufacturing costs.

4 Claims, 15 Drawing Sheets

(56) References Cited

U.S. PATENT DOCUMENTS

| | | | |
|---|---|---|---|
| 5,503,431 A * | 4/1996 | Yamamoto | 280/777 |
| 5,678,468 A * | 10/1997 | Lozano Bonet et al. | 83/588 |
| 5,992,191 A * | 11/1999 | Nickeas et al. | 70/218 |
| 6,345,842 B1 * | 2/2002 | Igarashi et al. | 280/775 |
| 6,419,395 B1 * | 7/2002 | Taylor | 384/42 |
| 6,524,092 B1 * | 2/2003 | Ito et al. | 425/444 |
| 6,817,436 B2 * | 11/2004 | Yang | 180/275 |
| RE39,440 E * | 12/2006 | Anspaugh et al. | 74/606 R |
| 7,367,588 B2 * | 5/2008 | Yamada | 280/777 |
| 7,552,945 B2 * | 6/2009 | Sato et al. | 280/775 |
| 8,051,742 B2 * | 11/2011 | Osawa et al. | 74/493 |
| 8,613,237 B2 * | 12/2013 | Lutz | 74/492 |
| 8,622,427 B2 * | 1/2014 | Minamigata et al. | 74/493 |
| 2001/0019205 A1 * | 9/2001 | Ikeda et al. | 280/775 |
| 2002/0011725 A1 * | 1/2002 | Lutz | 280/779 |
| 2002/0056981 A1 * | 5/2002 | Duffy | 280/779 |
| 2003/0172765 A1 * | 9/2003 | Heiml | 74/493 |
| 2004/0112165 A1 * | 6/2004 | Kinoshita et al. | 74/493 |
| 2004/0261564 A1 * | 12/2004 | Sato | 74/492 |
| 2005/0223838 A1 * | 10/2005 | Higashino et al. | 74/492 |
| 2006/0028010 A1 * | 2/2006 | Yamada | 280/775 |
| 2006/0048597 A1 * | 3/2006 | Heiml | 74/493 |
| 2006/0097501 A1 * | 5/2006 | Yoshimoto et al. | 280/777 |
| 2006/0214410 A1 * | 9/2006 | Sawada et al. | 280/775 |
| 2007/0068311 A1 * | 3/2007 | Shimoda et al. | 74/493 |
| 2007/0137377 A1 * | 6/2007 | Kamei | 74/493 |
| 2007/0137379 A1 * | 6/2007 | Sanji et al. | 74/493 |
| 2007/0194563 A1 * | 8/2007 | Menjak et al. | 280/777 |
| 2007/0235998 A1 * | 10/2007 | Demmon et al. | 280/775 |
| 2007/0295144 A1 * | 12/2007 | Nishioka et al. | 74/493 |
| 2007/0295145 A1 * | 12/2007 | Sekii et al. | 74/493 |
| 2008/0252055 A1 * | 10/2008 | Fong | 280/775 |
| 2008/0279490 A1 * | 11/2008 | Holcomb | 384/42 |
| 2009/0020996 A1 * | 1/2009 | Geibel et al. | 280/777 |
| 2009/0021038 A1 * | 1/2009 | Ohzono | 296/37.16 |
| 2009/0031843 A1 * | 2/2009 | Marable et al. | 74/493 |
| 2009/0056493 A1 * | 3/2009 | Dubay et al. | 74/492 |
| 2009/0151498 A1 * | 6/2009 | Garbrecht et al. | 74/493 |
| 2011/0308348 A1 * | 12/2011 | Ichie et al. | 74/493 |
| 2013/0098192 A1 * | 4/2013 | Davies | 74/493 |

FOREIGN PATENT DOCUMENTS

| | | |
|---|---|---|
| JP | 2006-036024 | 2/2006 |
| JP | 2008-213521 | 9/2008 |
| JP | 2008-308034 | 12/2008 |
| JP | 2009-023511 | 2/2009 |
| JP | 2009-107506 | 5/2009 |

OTHER PUBLICATIONS

Translation of JP 2009-107506.*

* cited by examiner (1)

(2)

STEERING DEVICE

TECHNICAL FIELD

The present invention relates to a steering device and especially a steering device capable of adjusting a telescopic position (backward and forward position) of a steering wheel in accordance with a driver's body type or a driving posture. More particularly, the invention relates to a steering device having a stopper that regulates a telescopic stroke end of an inner column in relation to an outer column and regulates relative rotation of the inner column in relation to the outer column.

BACKGROUND ART

A steering device capable of adjusting the telescopic position of a steering wheel is provided with a stopper that regulates the telescopic stroke end of an inner column in relation to an outer column and regulates relative rotation of the inner column in relation to the outer column. Patent Document 1 discloses a steering device having such stopper. FIG. 17 shows a stopper disclosed in Patent Document 1. FIG. 17 (1) is a plan view. FIG. 17 (2) is a cross sectional view taken along the line N-N of FIG. 17 (1). FIG. 17 (3) is a cross sectional view taken along the line O-O of FIG. 17 (2).

As shown in FIG. 17, a stopper according to Patent Document 1 includes an inner column 12 having its outer curved surface 121 externally fitted with an inner curved surface 111 of an outer column 11 so that the telescopic position is adjustable. The outer column 11 has a long hole 30 as long as a telescopic positioning range in the axial direction. A smaller long hole 71 is axially formed in the inner column 12. A nut 72 is pressed into the long hole 71 from the inner curved surface 122 of the inner column 12.

Bolts 74 are screwed into the nut 72 from the outer curved surface 112 of the outer column 11 to fix a stopper 73 onto the outer curved surface 121 of the inner column 12. The stopper 73 contacts with an inner surface of the long hole 30 so as to allow for appropriate engagement.

Such conventional stopper includes a gap between an outside diameter of the bolt 74 and a bolt hole in the stopper 73 for inserting the bolt 74. Accordingly, the bolt 74 needs to be tightly fastened so that the stopper 73 does not move even when the stopper 73 touches the long hole 30 at the telescopic stroke end and an impact force is repeatedly applied to the stopper 73.

However, the nut 72 hits a specified part of the inner curved surface 122 of the inner column 12 to deform the inner column 12, causing a problem of degrading the operational ability during telescopic operation. The nut 72 and the inner column 12 require the dimensional accuracy, increasing manufacturing costs.

The nut 72 needs to be pressed from the inner curved surface 122 of the inner column 12. The assembly operation is difficult and increases man-hours for the assembly. The diameter of the inner column 12 may be changed due to a spatial limitation on a vehicle for mounting the steering device. In such a case, the nut 72 needs to be changed in accordance with an inside diameter of the inner curved surface 122 of the inner column 12.

PRIOR ART DOCUMENTS

Patent Documents

Patent Document 1: JP-A No. 2005-335491

SUMMARY OF THE INVENTION

Problem to be Solved by the Invention

It is an object of the invention to provide a steering device capable of facilitating an assembly operation, decreasing the number of parts, and decreasing manufacturing costs.

Means for Solving the Problem

The above-mentioned object is achieved as follows. According to a first aspect of the present invention, there is provided a steering device including: an inner column; a hollow outer column that has an inner curved surface around an outer curved surface of the inner column so as to be capable of telescopic positioning and rotatably supports a steering shaft fitted with a steering wheel; a clamp unit that contracts and expands the inner curved surface of the outer column to clamp and unclamp the outer curved surface of the inner column at a specified telescopic adjustment position; a long hole that is formed in the outer column as long as a telescopic positioning range in an axial direction and is bored from the outer curved surface of the outer column to the inner curved surface of the outer column; a first through-hole that is formed in the inner column and is bored from the outer curved surface to the inner curved surface of the inner column in a radial direction; a stopper provided for the long hole; a second through-hole that is formed in the stopper and approximates to the first through-hole in diameter; and a blind rivet that is inserted from the outer curved surface of the outer column into the second through-hole and the first through-hole, exposes its tip from the inner curved surface of the inner column, and expands the tip to fix the stopper to the outer curved surface of the inner column.

According to a second aspect of the present invention, the steering device according to the first aspect of the present invention is provided as follows. Two blind rivets are provided. A stopper is fixed to the outer curved surface of the inner column at two positions axially separated on the outer column.

According to a third aspect of the present invention, the steering device according to the first aspect of the present invention is provided by using one blind rivet.

According to a fourth aspect of the present invention, the steering device according to the first aspect of the present invention is provided as follows. A blind rivet is used to fix one of two positions axially separated on the outer column. The stopper is burred to form a protrusion that is pressed into the inner column to fix the other of the two positions axially separated on the outer column.

According to a fifth aspect of the present invention, there is provided a steering device including: an inner column; a hollow outer column that has an inner curved surface around an outer curved surface of the inner column so as to be capable of telescopic positioning and rotatably supports a steering shaft fitted with a steering wheel; a clamp unit that contracts and expands the inner curved surface of the outer column to clamp and unclamp the outer curved surface of the inner column at a specified telescopic adjustment position; a long hole that is formed in the outer column as long as a telescopic positioning range in an axial direction and is bored from the outer curved surface of the outer column to the inner curved surface of the outer column; a first through-hole that is formed in the inner column and is bored from the outer curved surface to the inner curved surface of the inner column in a radial direction; and a blind rivet having a head section that is inserted from the outer curved surface of the outer column into the first through-hole, exposes its tip from the inner curved surface of the inner column, expands the tip, is fixed to the outer curved surface of the inner column, and comes in contact with an inner surface of the long hole in a vehicle width direction.

According to a sixth aspect of the present invention, there is provided a steering device including: an inner column; a hollow outer column that has an inner curved surface around an outer curved surface of the inner column so as to be capable of telescopic positioning and rotatably supports a steering shaft fitted with a steering wheel; a clamp unit that contracts and expands the inner curved surface of the outer column to clamp and unclamp the outer curved surface of the inner column at a specified telescopic adjustment position; a long hole that is formed in the inner column as long as a telescopic positioning range in an axial direction and is bored from the outer curved surface of the outer column to the inner curved surface of the outer column; a third through-hole that is formed in the outer column and is bored from the outer curved surface to the inner curved surface of the outer column in a radial direction; and a blind rivet that is inserted from the outer curved surface of the outer column into the third through-hole and the long hole, exposes its tip from the inner curved surface of the inner column, and expands the tip, and is fixed to the outer curved surface of the outer column.

Effect of the Invention

A steering device according to the present invention is provided with a blind rivet that is inserted from the outer curved surface of the outer column into the second through-hole and the first through-hole, exposes its tip from the inner curved surface of the inner column, and expands the tip to fix the stopper to the outer curved surface of the inner column.

Accordingly, it is unnecessary to use a nut for fixing the stopper to the inner column. The number of parts decreases to reduce manufacturing costs. There is no need for a work procedure of pressing a nut from the inner curved surface of the inner column. All assembly procedures can be done from the outer curved surface of the outer column. It is possible to facilitate the assembly work and reduce man-hours for the assembly.

BEST MODE FOR CARRYING OUT THE INVENTION

The following embodiments describe examples of applying the present invention to a tilt/telescopic steering device that adjusts both a tilt position and a telescopic position of a steering wheel.

First Embodiment

Figure 1:
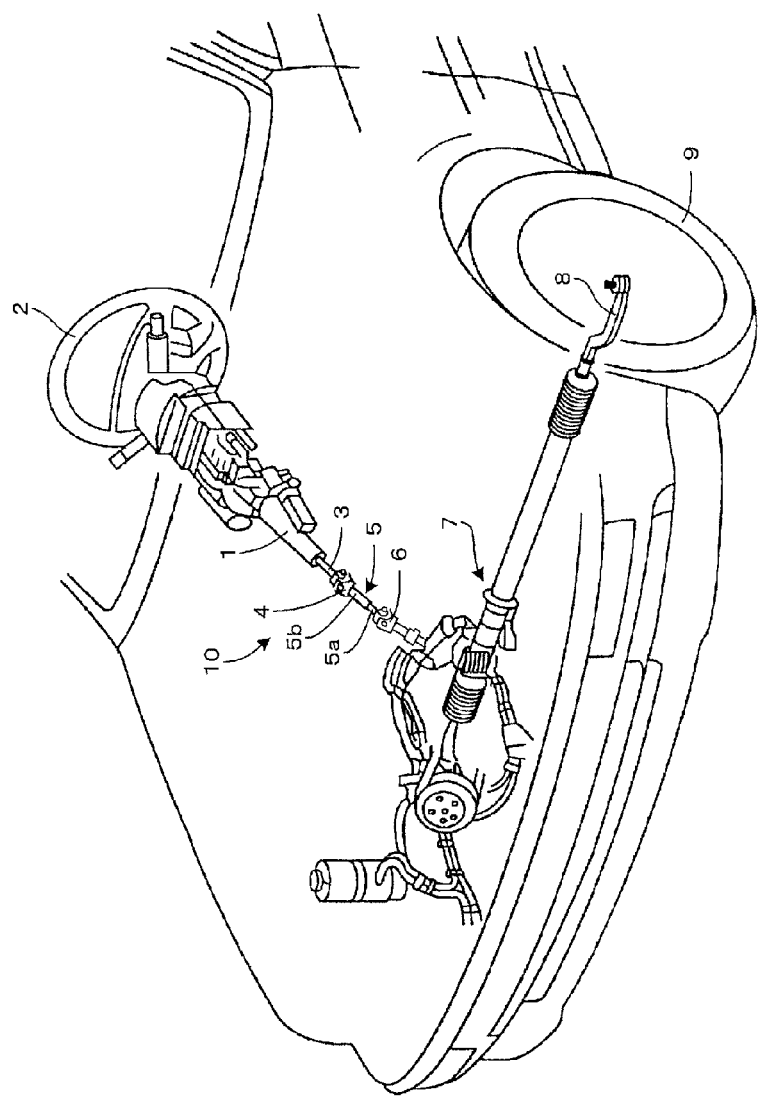
FIG. 1 is an overall perspective view showing a steering device according to an embodiment of the invention mounted on a vehicle.

FIG. 1 is an overall perspective view showing a steering device 10 according to the invention mounted on a vehicle. As shown in FIG. 1, a hollow and cylindrical column 1 is mounted on a vehicle body. The column 1 rotatably supports a steering shaft 3. A steering wheel 2 is attached to the right end (to the rear of the vehicle body) of the steering shaft 3. An intermediate shaft 5 is coupled to the left end (to the front of the vehicle body) of the steering shaft 3 via a universal joint 4.

The intermediate shaft 5 includes a solid intermediate inner shaft 5a formed with a male spline and a hollow and cylindrical intermediate outer shaft 5b formed with a female spline. The male spline of the intermediate inner shaft 5a telescopically (slidably) engages with the female spline of the intermediate outer shaft 5b so as to be able to transmit the rotation torque.

To the rear of the vehicle body, the intermediate outer shaft 5b is coupled to the universal joint 4. To the front of the vehicle body, the intermediate inner shaft 5a is coupled to a universal joint 6. The universal joint 6 is coupled to a pinion that engages with a rack (not shown) of a steering gear 7.

When a driver rotates the steering wheel 2, the rotary force is transmitted to the steering gear 7 through the steering shaft 3, the universal joint 4, the intermediate shaft 5, and the universal joint 6. The rotary force can move a tie rod 8 through a rack-and-pinion mechanism and change a steering angle of a front wheel 9.

Figure 2:
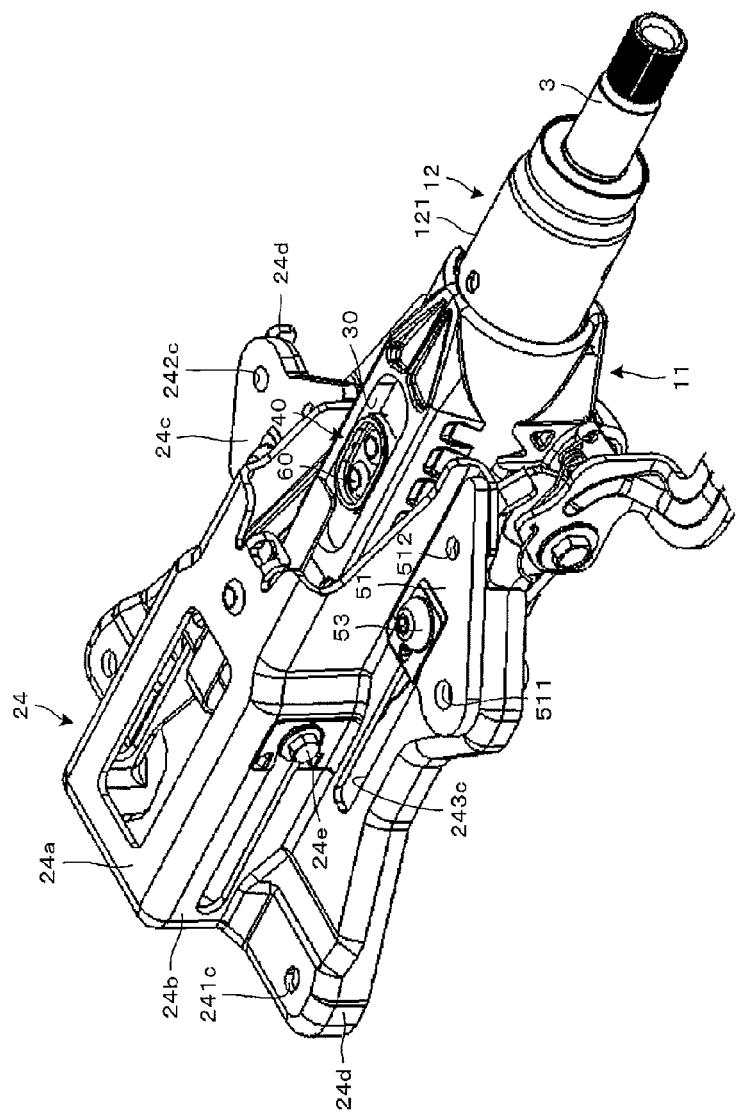
FIG. 2 is a perspective view showing main parts of the steering device according to a first embodiment of the invention viewed from the top of a vehicle.
Figure 3:
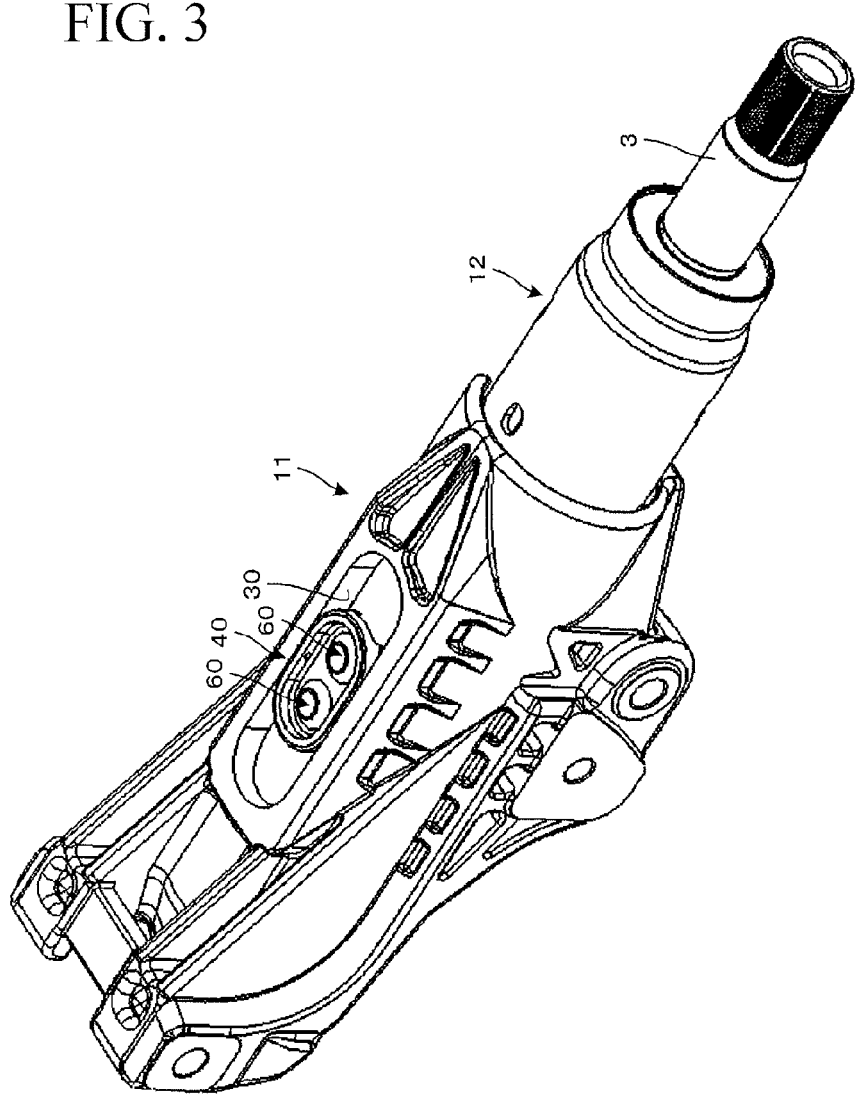
FIG. 3 is a perspective view showing only an outer column and an inner column by removing a mounting bracket from FIG. 2.
Figure 4:
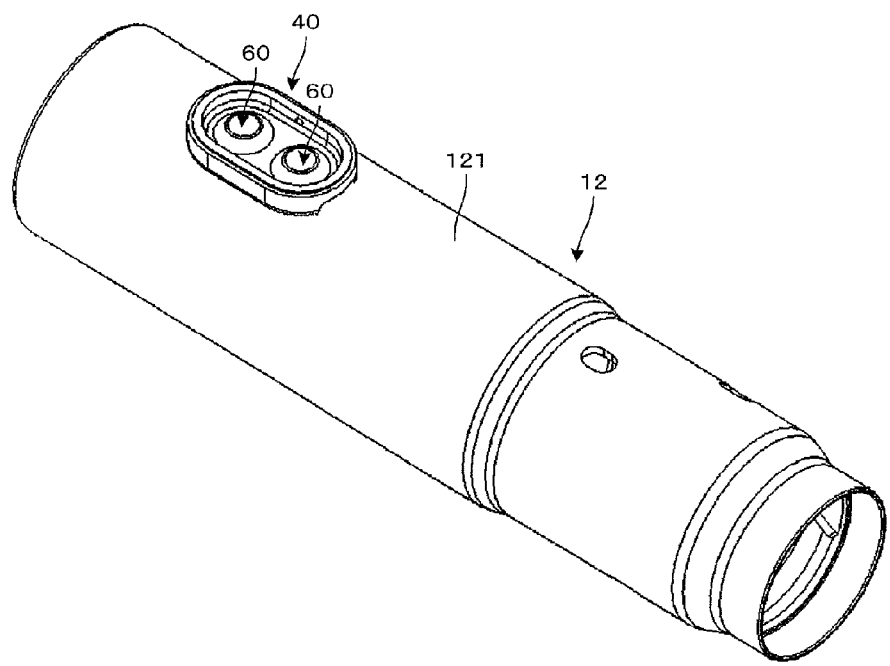
FIG. 4 is a perspective view of the inner column itself in FIG. 3.
Figure 5:
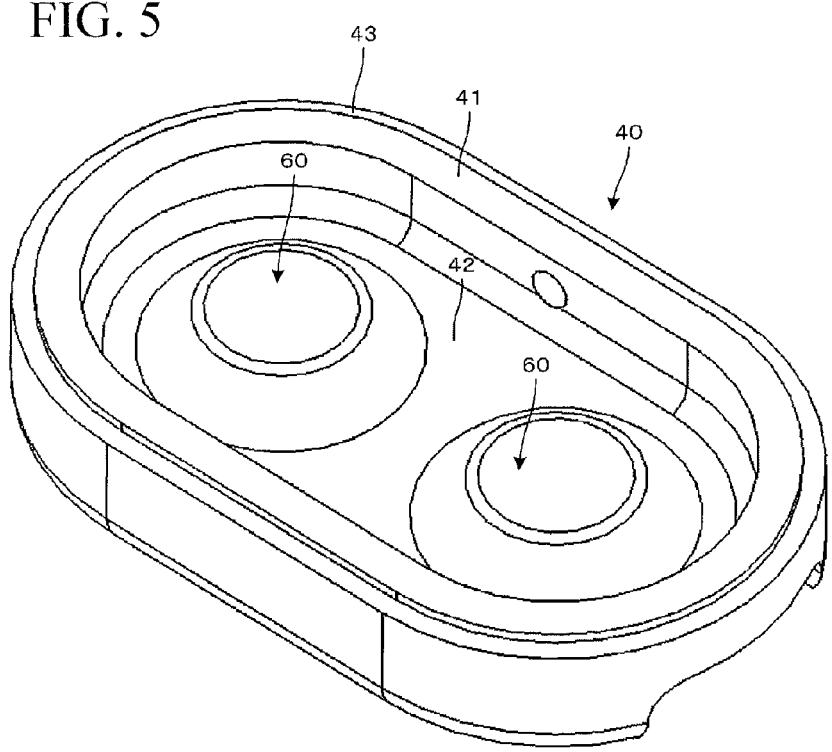
FIG. 5 is an enlarged perspective view showing the stopper in FIG. 4.
Figure 6:
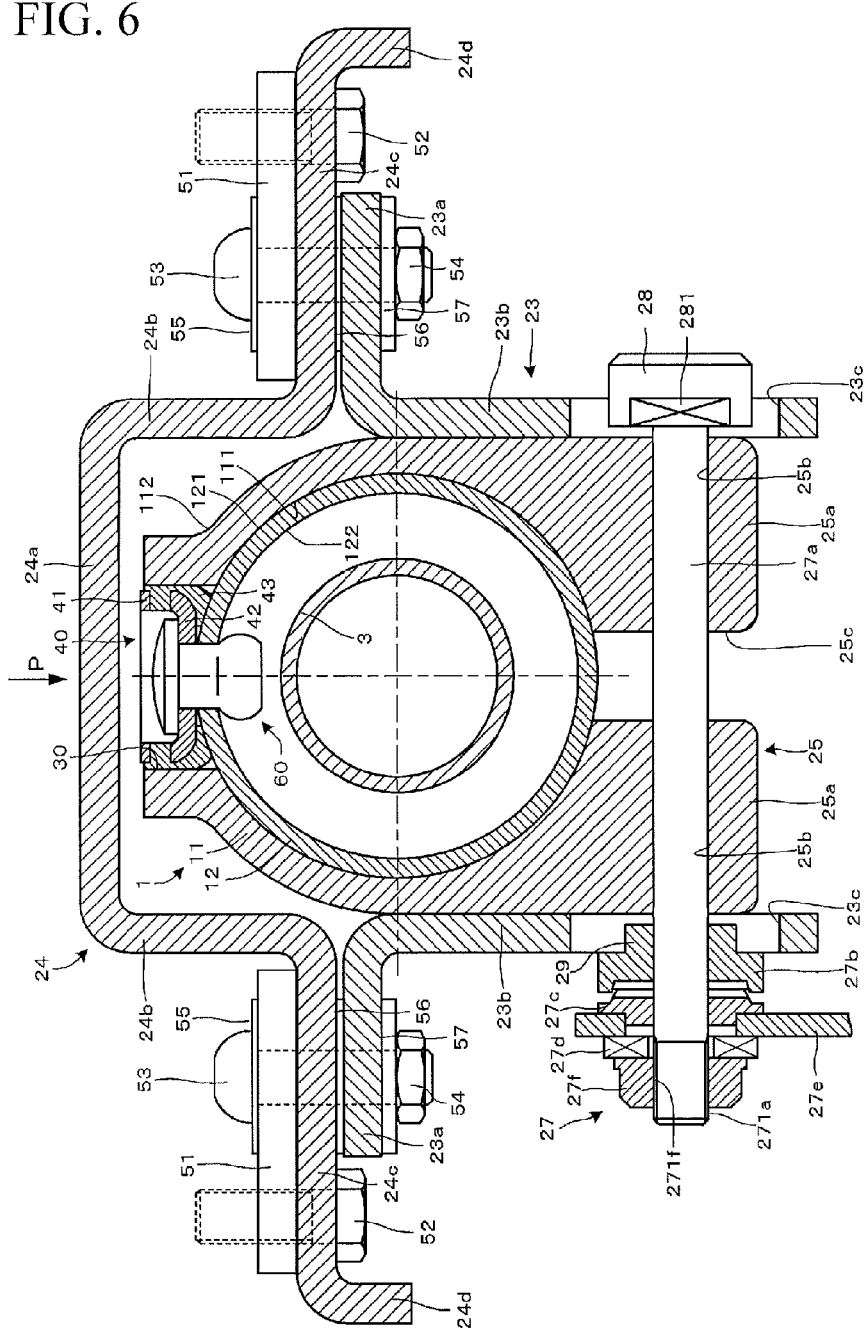
FIG. 6 is an enlarged vertical sectional view of FIG. 2.
Figure 7:
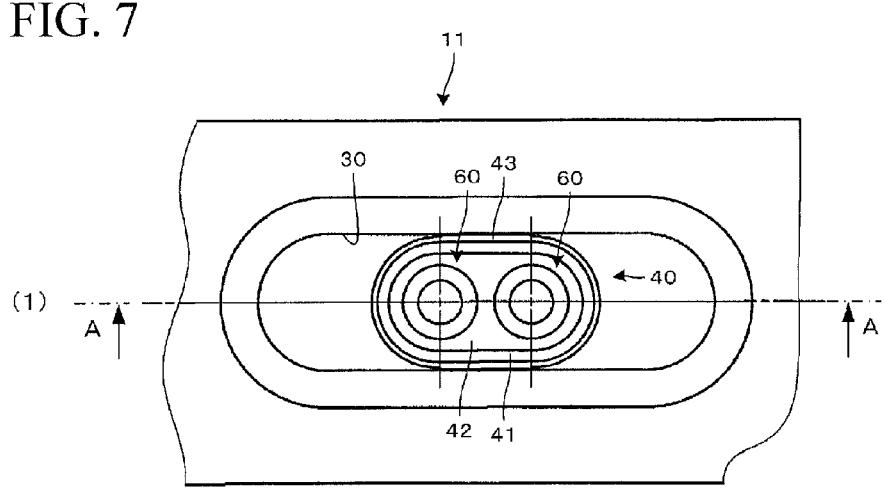
FIG. 7 (1) shows a view along arrow P in FIG. 6 and FIG. 7 (2) is a sectional view taken along the line A-A in FIG. 7 (1)
Figure 7:
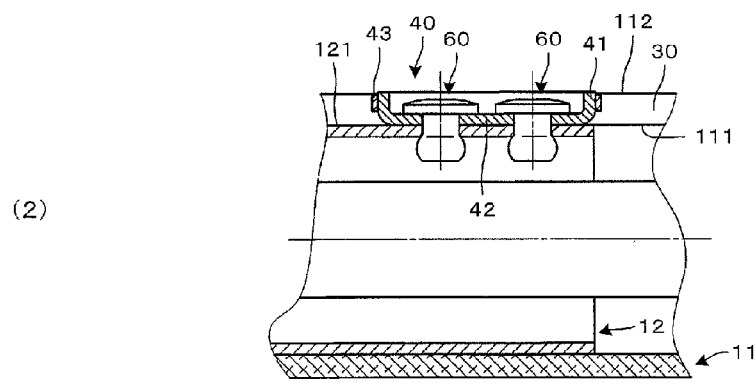

FIG. 2 is a perspective view showing main parts of the steering device according to the first embodiment of the invention viewed from the top of a vehicle. FIG. 3 is a perspective view showing only an outer column and an inner column by removing a mounting bracket from FIG. 2. FIG. 4 is a perspective view of the inner column itself in FIG. 3. FIG. 5 is an enlarged perspective view showing the stopper in FIG. 4. FIG. 6 is an enlarged vertical sectional view of FIG. 2. FIG. 7 (1) shows a view along arrow P in FIG. 6. FIG. 7 (2) is a sectional view taken along the line A-A in FIG. 7 (1).

As shown in FIGS. 2 through 7, the steering shaft 3 is inserted into the cylindrical column 1. The column 1 contains the outer column 11 that further contains the inner column 12 so as to be telescopically movable.

The outer column 11 is made of aluminum alloy and is integrally formed with a column clamp member 25. The column clamp member 25 extends from the outer column 11 toward the bottom of the vehicle body. The column clamp member 25 has a pair of side plates 25a corresponding to the vehicle width direction. Through-holes 25b are formed in the side plates 25a. The column clamp member 25 encloses the outer curved surface 121 of the inner column so as to be telescopically movable.

A tilt bracket 23 supports the column clamp member 25 via a clamp unit 27 so that the tilt position is adjustable. Toward the front of the vehicle body, the tilt bracket 23 oscillatably supports the outer column 11 about a pivot pin 24e so as to be movable to the top and the bottom of the vehicle body (vertically in FIG. 6).

The mounting bracket 24 extends in the vehicle length direction along the top of the column 1 and is fixed to the vehicle body (not shown). The mounting bracket 24 is provided so as to cover the tilt bracket 23 from the top. When a driver bumps against the steering wheel 2 as the second collision to generate a large impact force, the tilt bracket 23 disengages from the mounting bracket 24 toward the front of the vehicle body. A shock-absorbing member (not shown) is plastically deformed to absorb the shock energy generated from the second collision.

The mounting bracket 24 includes: an upper plate 24a extending along the top of the column 1 in the vehicle length direction; a pair of side plates 24b; and a pair of lower plates 24c. The pair of side plates 24b is formed by bending the upper plate 24a downward at both ends in the vehicle width direction so as to be L-shaped. The pair of side plates 24b is parallel separated from each other.

The pair of lower plates 24c is formed by bending the pair of side plates 24b at bottom ends (to the bottom of the vehicle body) so as to be L-shaped outward in the vehicle width direction. Bent portions 24d are formed by bending downward both outside ends of the pair of lower plates 24c in the vehicle width direction so as to be L-shaped. The bent portions 24d increase rigidity of the mounting bracket 24.

Bolt holes 241c and 242c are formed in the pair of lower plates 24c at two positions, toward the front of the vehicle body and toward the rear thereof, in order to fix the mounting bracket 24 to the vehicle body. Approximately triangular and flat reinforcing plates 51 are separately fixed to the top of the pair of lower plates 24c toward the rear of the vehicle body (to the right in FIG. 2). When viewed in FIG. 6, the reinforcing plates 51 are formed symmetrically with respect to the shaft center of the outer column 11.

Each of the reinforcing plates 51 includes a bolt hole 511, a circular tightening hole 512, and a notch (not shown) opened toward the front of the vehicle body. Each of the tightening holes 512 in each of the reinforcing plates 51 is positioned to engage with a columnar tightening pin (not shown) that is protruded on the top surface of each of the lower plates 24c of the mounting bracket 24. The tightening pin is inserted into the tightening hole 512 to position the reinforcing plate 51 against the lower late 24c of the mounting bracket 24. Tightening the tightening pin in the tightening hole 512 fixes the reinforcing plate 51 to the lower late 24c of the mounting bracket 24.

The bolt holes 511 in the reinforcing plates 51 are positioned so as to engage with bolt holes 242c in the mounting bracket 24 toward the rear of the vehicle body. As shown in FIG. 6, bolts 52 are inserted from the side of the vehicle body bottom into the bolt holes 242c in the mounting bracket 24 toward the rear of the vehicle body and are screwed into the vehicle body through the bolt holes 511 in the reinforcing plates 51. As a result, the lower plates 24c of the mounting bracket 24 are fixed to the vehicle body through the reinforcing plates 51.

Similarly, bolts (not shown) are inserted from the side of the vehicle body bottom into the bolt holes 241c in the mounting bracket 24 and are screwed into the vehicle body to fix the lower plates 24c of the mounting bracket 24 to the vehicle body. That is, the mounting bracket 24 is fixed to the vehicle body at two positions, toward the front of the vehicle body and toward the rear thereof.

The notches of the reinforcing plates 51 are formed so as to engage with guide grooves 243c formed on the lower plates 24c of the mounting bracket 24. The guide grooves 243c are formed parallel to the shaft center of the outer column 11 so as to extend from the notches of the reinforcing plates 51 toward the vehicle body front.

The upper plates 23a of the tilt bracket 23 (see FIG. 6) are attached to the lower plates 24c of the mounting bracket 24 with a bolt 53 and a nut 54 so as to be detachable toward the vehicle body front. The bolt 53 is inserted from the side toward the vehicle body top through the notch of the reinforcing plate 51, the guide groove 243c of the mounting bracket 24, and the bolt hole in the upper plate 23a of the tilt bracket 23, and is screwed into the nut 54.

A low-friction plate 55 is inserted between the bolt 53 and the top surface of the reinforcing plate 51. A low-friction plate 56 is inserted between the bottom surface of the lower plate 24c of the mounting bracket 24 and the top surface of the upper plate 23a of the tilt bracket 23. A reinforcing back plate 57 is inserted between the nut 54 and the bottom surface of the upper plate 23a of the tilt bracket 23. Adjusting the tightening torque of the bolt 53 can adjust a disengaging load applied when the tilt bracket 23 disengages from the mounting bracket 24 toward the vehicle body front. The reinforcing back plate 57 is omissible.

A pair of side plates 23b is formed to be L-shaped by downward bending the tilt bracket 23 from the inside ends of the upper plates 23a. The pair of side plates 23b is parallel separated from each other.

The side plates 23b touch the pair of side plates 25a of the column clamp member 25 so as to embrace the side plates 25a from outside along the vehicle width direction. A slit 25c is formed between the pair of side plates 25a to reach the inner curved surface 111 of the outer column 11. The pair of side plates 23b each has a tilt positioning long groove 23c that is formed to extend its long axis vertically.

As shown in FIG. 6, the clamp unit (tilt/telescopic clamp unit) 27 has a tightening rod 27a that is inserted into the tilt positioning long grooves 23c of the tilt bracket 23 and the through-holes 25b of the column clamp member 25.

At the screw side (to the left of FIG. 6), the tightening rod 27a is externally fitted with a stationary cam 27b, a movable cam 27c, an operation lever 27e, a thrust bearing 27d, and an adjustment nut 27f in this order. A female screw 271f is threaded inside the adjustment nut 27f and is screwed into a male screw 271a formed at the left end of the tightening rod 27a.

The operation lever 27e is fixed to the left end face of the movable cam 27c. The operation lever 27e jointly operates the movable cam 27c and the stationary cam 27b that configure a cam lock mechanism. A head section 28 is formed at the right of the tightening rod 27a. The head section 28 touches the lateral surface of the side plate 23b.

A rotation stop section 281 is formed on the left outside of the head section 28. The rotation stop section 281 has a rectangular cross section that is slightly narrower than the width of the tilt positioning long groove 23c on the right. The rotation stop section 281 engages with the tilt positioning long groove 23c on the right to prevent the tightening rod 27a from rotating against the tilt bracket 23. The rotation stop section 281 allows the tightening rod 27a to slide along the tilt positioning long groove 23c on the right for tilt position adjustment.

The stationary cam 27b and the movable cam 27c provide the cam mechanism that converts a rotating operation of the operation lever 27e into axial movement of the tightening rod 27a. That is, the rotation stop section 29 is formed on the reverse side of the stationary cam 27b and engages with the tilt positioning long groove 23c on the left to prevent rotation against the side plate 23b on the left. When the tilt position of the column 1 is adjusted, the stationary cam 27b slide along the tilt positioning long groove 23c on the left. Manually rotating the operation lever 27e rotates the movable cam 27c with reference to the stationary cam 27b.

When the operation lever 27e is rotated in a clamping direction, a cam face slope of the movable cam 27c slides along a cam face slope of the stationary cam 27b. The tightening rod 27a is pulled to the left in FIG. 6. At the same time, the stationary cam 27b is pushed to the right in FIG. 6.

The head section 28 pushes the right side plate 23b to the left in FIG. 6. The right side plate 23b is deformed inward. The right end face of the stationary cam 27b pushes the left side plate 23b to the right. The left side plate 23b is deformed inward. The left side plate 23b then strongly pushes the left side plate 25a of the column clamp member 25. At the same time, the side plate 23b strongly pushes the right side plate 25a of the column clamp member 25.

The side plates 23b of the tilt bracket 23 tighten the side plates 25a of the column clamp member 25. The column clamp member 25 can be clamped by tilt tightening. The inner curved surface 111 of the outer column 11 shrinks to tighten the outer curved surface 121 of the inner column 12. The outer column 11 prevents movement of the inner column 12 in the telescopic direction. The outer column 11 is fixed to the tilt bracket 23, preventing movement of the outer column 11 in the tilt direction and movement of the inner column 12 in the telescopic direction.

When an operator rotates the operation lever 27e in a release direction, the side plates 23b of the tilt bracket 23 elastically return in a direction opposite the clamping direction. Therefore, the outer column 11 is freed from the side plates 23b of the tilt bracket 23. In this state, the rotation stop section 29, the rotation stop section 281, and the tightening rod 27a are guided to the tilt positioning long grooves 23c and are moved in the tilt direction. The steering wheel 2 can be freely adjusted in the tilt direction. The outer curved surface 121 of the inner column 12 is guided to the inner curved surface 111 of the outer column 11 to move the inner column 12 in the telescopic direction. The steering wheel 2 can be freely adjusted in the telescopic direction.

The following describes a stopper that regulates the telescopic stroke end of the inner column 12 against the outer column 11 and regulates relative rotation of the inner column 12 against the outer column 11 during the adjustment in the telescopic direction.

A long hole 30 is formed in the outer column 11 toward the vehicle top (toward the top in FIG. 6) as long as a telescopic positioning range in the axial direction. The long hole 30 is bored from the outer curved surface 112 to the inner curved surface 111 of the outer column 11. The stopper 40 is fixed to the outer curved surface 121 of the inner column 12 toward the vehicle top (toward the top in FIG. 6) with two rivets 60.

As shown in FIGS. 5 through 7, the stopper includes an oval side plate 41 as a plan view and a bottom plate 42 for covering the bottom face of the side plate 41. A thin-plate slide member 43 is pressed and fixed around the side plate 41. The side plate 41 and the bottom plate 42 are made of iron and are formed integrally. The lateral surface of the slide member 43 in the vehicle width direction is placed in contact with the inner surface of the long hole 30 in the vehicle width direction. The slide member 43 is made of resin and indicates a small friction coefficient. The stopper 40 can slide along the inner surface of the long hole 30 with a small sliding resistance and smoothly and telescopically move the inner column 12 against the outer column 11.

During adjustment in the telescopic direction, the lateral surface of the slide member 43 in the vehicle length direction comes in contact with the inner surface of the long hole 30 in the vehicle length direction to regulate the telescopic stroke end of the inner column 12 against the outer column 11. Further, the lateral surface of the slide member 43 in the vehicle width direction comes in contact with the inner surface of the long hole 30 in the vehicle width direction to regulate the relative rotation of the inner column 12 against the outer column 11.

The following describes how to assemble the stopper 40 according to the first embodiment of the invention. FIGS. 8 through 11 are explanatory diagrams showing a procedure of assembling the stopper 40 according to the first embodiment of the invention. FIG. 12 (1) is an enlarged sectional view of portion Q in FIG. 10 (2). FIG. 12 (2) is an enlarged sectional view of portion R in FIG. 11 (2).

Figure 8:
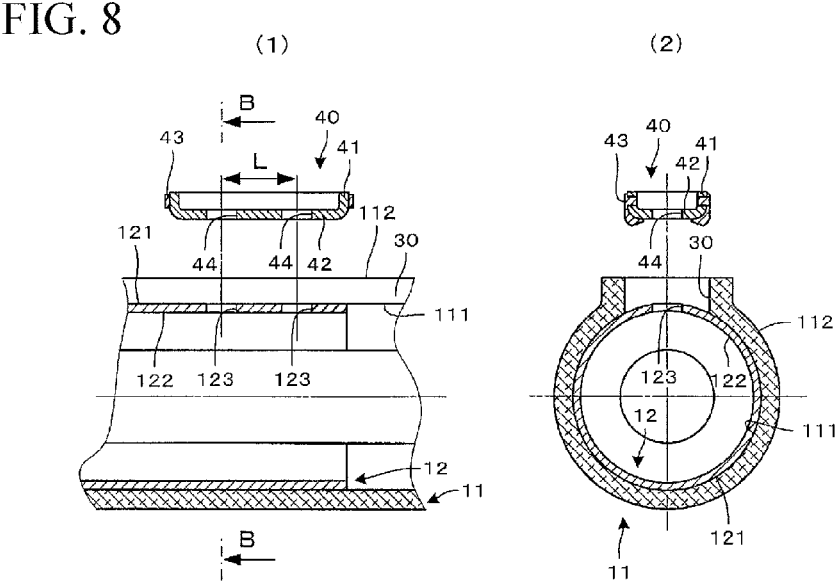
FIG. 8 is an explanatory diagram showing an assembly procedure of the stopper according to the first embodiment of the invention, wherein FIG. 8 (1) is a vertical sectional view of main parts and FIG. 8 (2) is a sectional view taken along the line B-B in FIG. 8 (1)
Figure 9:
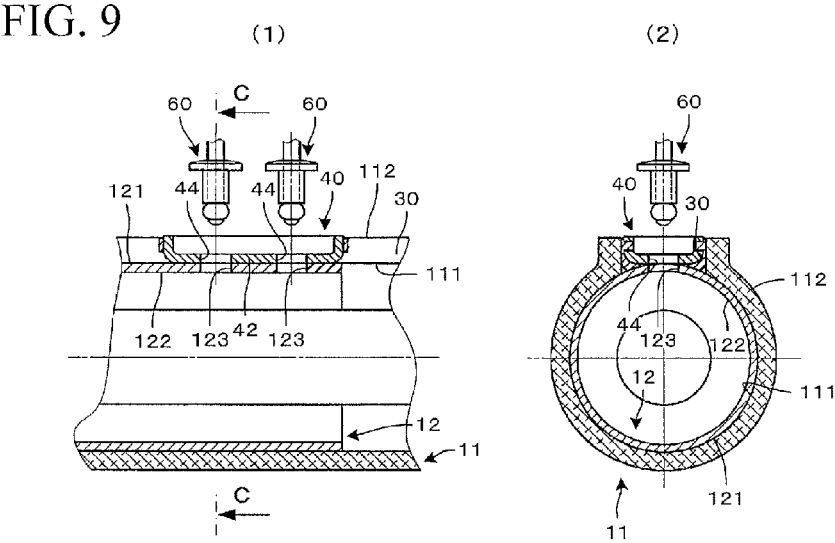
FIG. 9 is an explanatory diagram showing a process after the assembly procedure in FIG. 8, wherein FIG. 9 (1) is a vertical sectional view of main parts and FIG. 9 (2) is a sectional view taken along the line C-C in FIG. 9 (1)

As shown in FIGS. 8 (1) and 8 (2), the outer curved surface 121 of the inner column 12 is fit into the inner curved surface 111 of the outer column 11. As shown in FIGS. 9 (1) and 9 (2), the stopper 40 is inserted into the long hole 30 so as to be mounted on the outer curved surface 121 of the inner column 12. Two first through-holes 123 are formed in the inner column 12. Two second through-holes 44 are formed in the bottom plate 42 of the stopper 40. Shaft centers of the first through-holes 123 must correspond to those of the second through-holes 44.

The first through-holes 123 are formed in the inner column 12 at two positions separated from each other in the axial direction. The first through-hole 123 is bored from the outer curved surface 121 to the inner curved surface 122 of the inner column 12. The first through-hole 123 has an oval cross section and is formed in the radial direction of the inner column 12. The second through-hole 44 is circular and has the same diameter as the first through-hole 123. The second through-holes 44 are formed with the same interval as interval L (see FIG. 8 (1)) for the first through-holes 123 in the axial direction.

Figure 10:
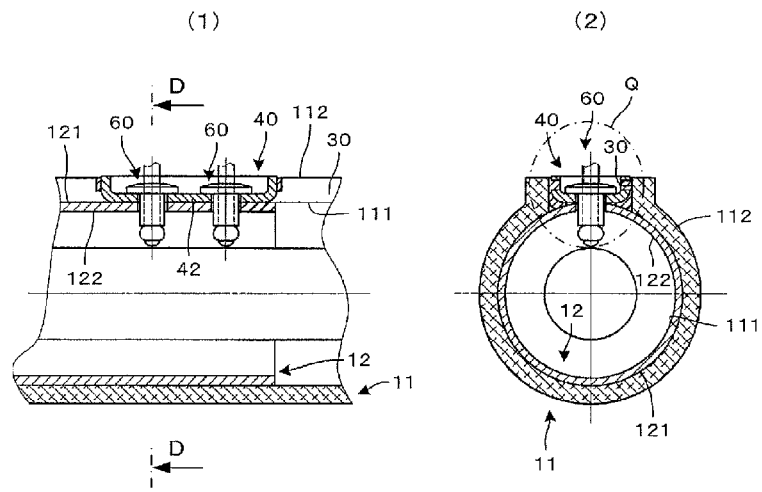
FIG. 10 is an explanatory diagram showing a process after the assembly procedure in FIG. 9, wherein FIG. 10 (1) is a vertical sectional view of main parts and FIG. 10 (2) is a sectional view taken along the line D-D in FIG. 10 (1)

As shown in FIGS. 10 (1) and 10 (2), the blind rivet 60 is inserted into the second through-hole 44 and the first through-hole 123 from the outer curved surface 112 of the outer column 11. The tip of the blind rivet 60 protrudes from the inner curved surface 122 of the inner column 12.

As enlarged in FIG. 12 (1), the blind rivet 60 includes a hollow and cylindrical rivet body 61 and a mandrel 62 inserted into the hollow cylinder of the rivet body 61. An outside diameter d1 of the rivet body 61 is smaller than an inside diameter D1 of the first through-hole 123 and the second through-hole 44. In the state of FIG. 12 (1), there is a gap between the outside surface of the rivet body 61 and each of the first through-hole 123 and the second through-hole 44. A large-diameter disk-shaped head section 64 is formed at the top end of the rivet body 61.

Figure 11:
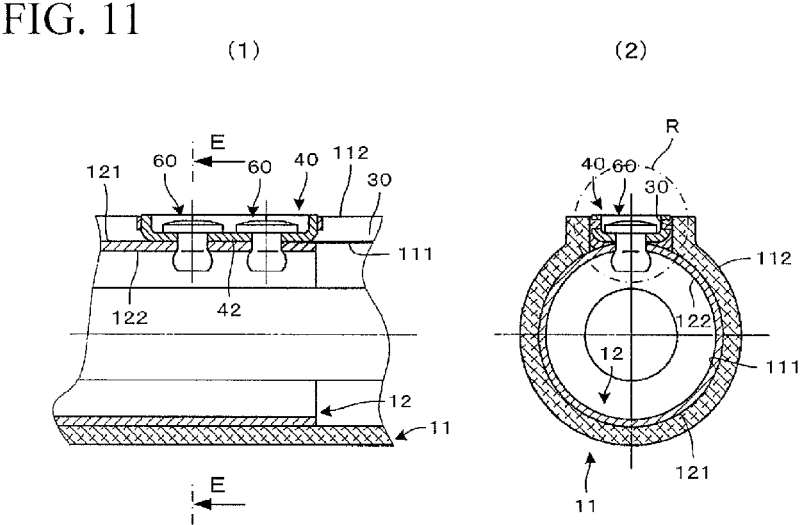
FIG. 11 is an explanatory diagram showing a process after the assembly procedure in FIG. 10, wherein FIG. 11 (1) is a vertical sectional view of main parts and FIG. 11 (2) is a sectional view taken along the line E-E in FIG. 11 (1)
Figure 12:
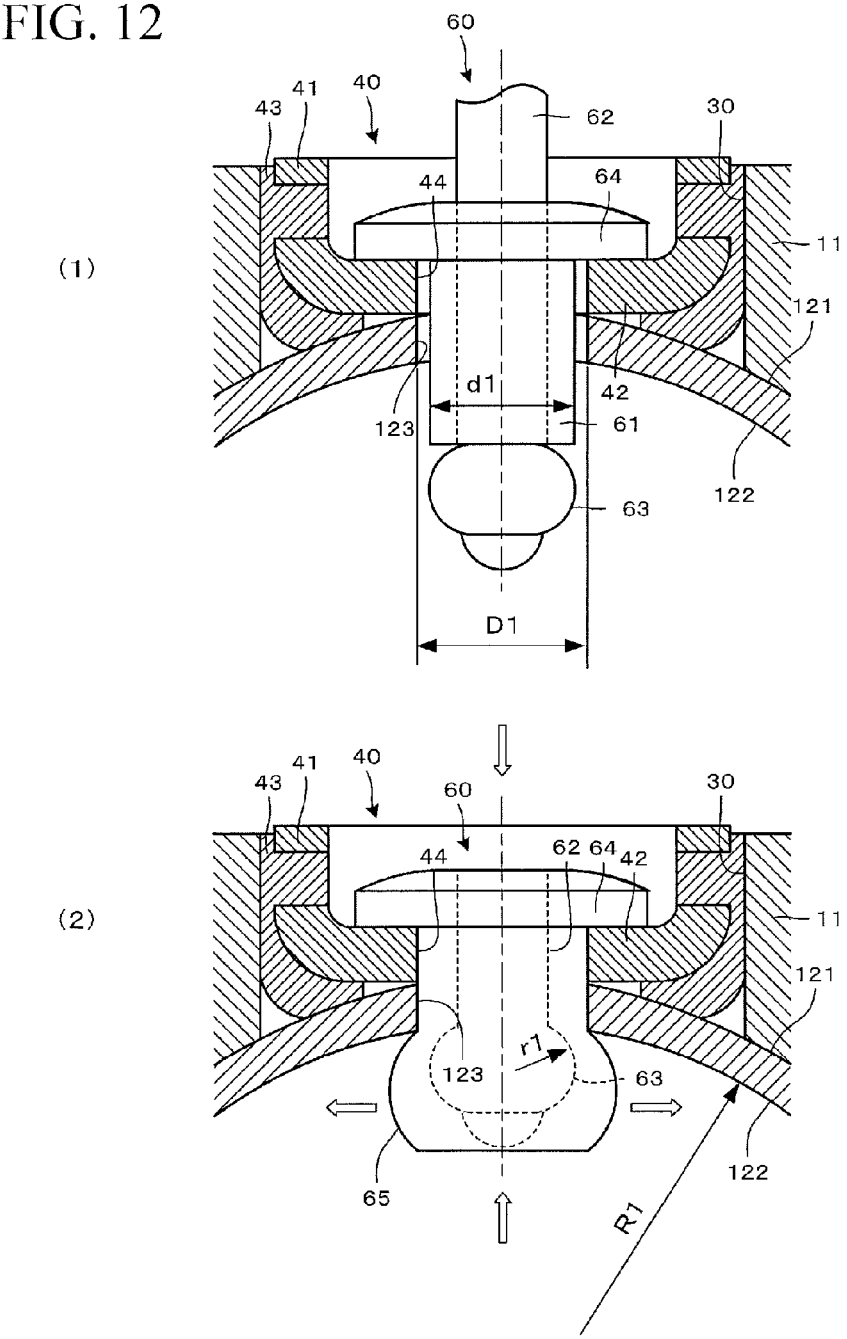
FIG. 12 (1) is an enlarged sectional view of portion Q in FIG. 10 (2) and FIG. 12 (2) is an enlarged sectional view of portion R in FIG. 11 (2)

As shown in FIGS. 11 and 12 (2), a rivet tool (not shown) is used to hold the top end of the mandrel 62 and pull up the mandrel 62. As indicated by white arrows, a spherical section 63 at the bottom end of the mandrel 62 expands the bottom end of the rivet body 61. A spherically bulged section 65 is formed at the bottom end of the rivet body 61. The rivet body 61 contracts in the axial direction. The mandrel 62 is broken at the top of the spherical section 63.

As a result, the bottom plate 42 of the stopper 40 is tightened to the outer curved surface 121 of the inner column 12 between the head section 64 and the bulged section 65 of the rivet body 61. The outside diameter of the rivet body 61 increases to eliminate the gap between the first through-hole 123 and the second through-hole 44. The stopper 40 remains stationary even when it touches the long hole 30 at a telescopic stroke end and repeatedly receives an impact force. The durability of the stopper 40 improves.

As shown in FIG. 12 (2), the radius r1 for the spherical section 63 at the bottom end of the mandrel 62 is too smaller than the radius R1 for the inner curved surface 122 of the inner column 12. The inner column 12 hardly deforms even when the bulged section 65 is strongly pressed against the inner curved surface 122 of the inner column 12. There arises no problem of requiring a large operating force during the telescopic operation.

The first embodiment of the invention eliminates a nut for fixing the stopper 40 to the inner column 12. The number of parts decreases to reduce manufacturing costs. There is no need for a work procedure of pressing a nut from the inner curved surface 122 of the inner column. All assembly procedures can be done from the outer curved surface 112 of the outer column 11. It is possible to facilitate the assembly work and reduce man-hours for the assembly.

Second Embodiment

Figure 13:
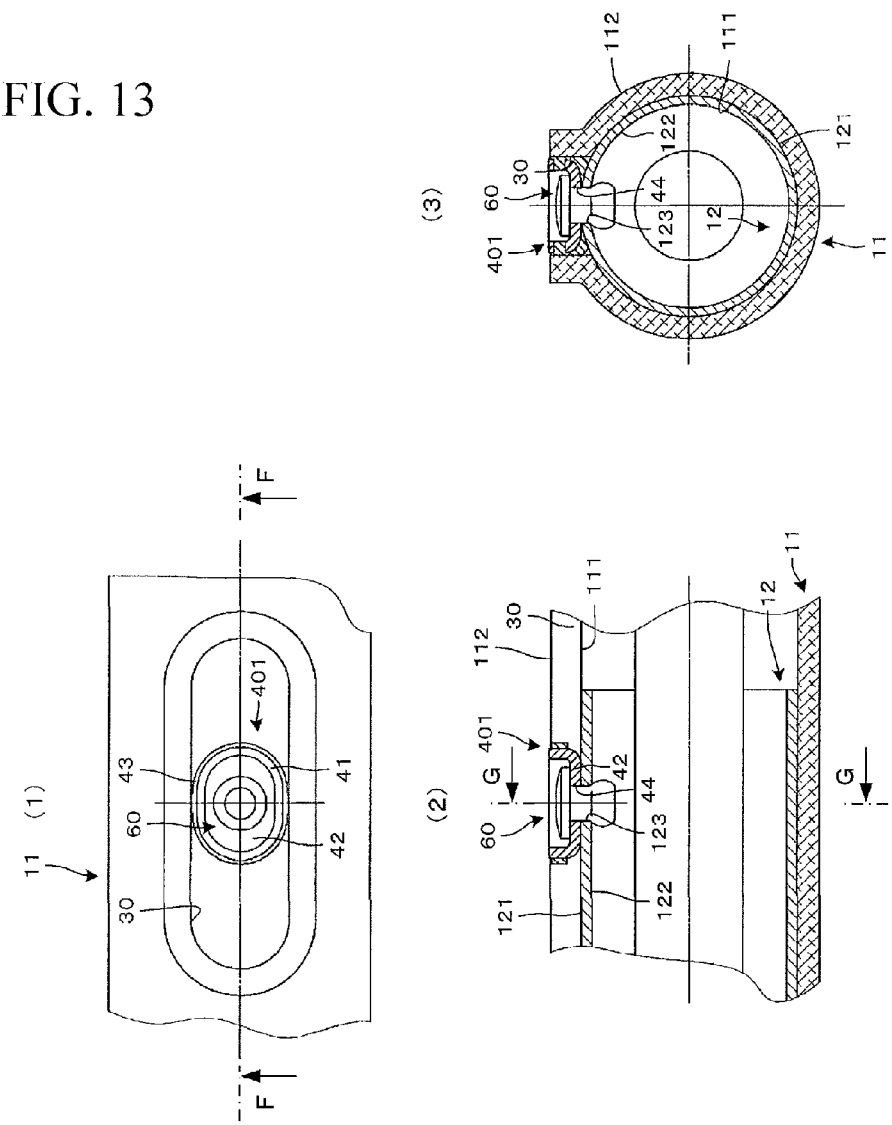
FIG. 13 shows a stopper according to a second embodiment of the invention, wherein FIG. 13 (1) is equivalent to FIG. 7 (1) of the first embodiment, FIG. 13 (2) is a sectional view taken along the line F-F in FIG. 13 (1), and FIG. 13 (3) is a sectional view taken along the line G-G in FIG. 13 (2)

The second embodiment of the invention will be described. FIG. 13 shows a stopper according to the second embodiment of the invention. FIG. 13 (1) is equivalent to FIG. 7 (1) of the first embodiment. FIG. 13 (2) is a sectional view taken along the line F-F in FIG. 13 (1). FIG. 13 (3) is a sectional view taken along the line G-G in FIG. 13 (2). The following description contains only differences from the first embodiment and omits the duplication. The same parts are depicted by the same reference numerals.

The second embodiment shows an example of fixing the stopper using one blind rivet. According to the second embodiment as shown in FIG. 13, the long hole 30 is formed in the outer column 11 as long as a telescopic positioning range in the axial direction similarly to the first embodiment.

Similarly to the first embodiment, a stopper 401 according to the second embodiment includes the oval side plate 41 as a plan view and the bottom plate 42 for covering the bottom face of the side plate 41. The thin-plate slide member 43 is pressed and fixed around the side plate 41. The stopper 401 according to the second embodiment is shorter than the stopper 40 according to the first embodiment in the axial direction.

According to the second embodiment, one first through-hole 123 is formed in the inner column 12. One second through-hole 44 is formed in the bottom plate 42 of the stopper 401. The one blind rivet 60 is inserted into the second through-hole 44 and the first through-hole 123 from the outer curved surface 112 of the outer column 11. Then, similarly to the first embodiment, a rivet tool is used to tighten the bottom plate 42 of the stopper 401 to the outer curved surface 121 of the inner column 12.

The second embodiment of the invention can shorten the long hole 30 and the stopper 401 in the axial direction and therefore shorten the entire length of the steering device.

Third Embodiment

Figure 14:
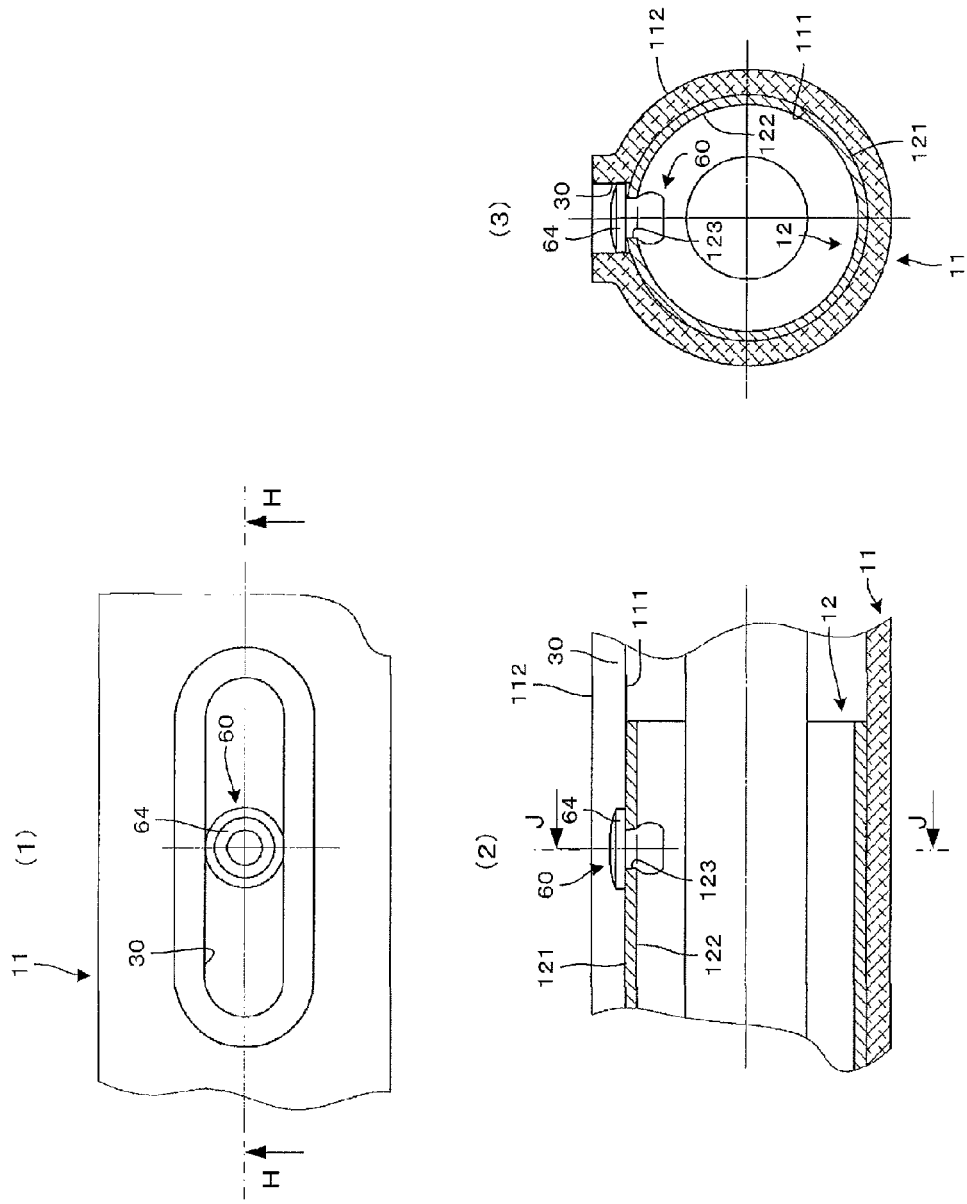
FIG. 14 shows a stopper according to a third embodiment of the invention, wherein FIG. 14 (1) is equivalent to FIG. 7 (1) of the first embodiment, FIG. 14 (2) is a sectional view taken along the line H-H in FIG. 14 (1), and FIG. 14 (3) is a sectional view taken along the line J-J in FIG. 14 (2)

The third embodiment of the invention will be described. FIG. 14 shows a stopper according to the third embodiment of the invention. FIG. 14 (1) is equivalent to FIG. 7 (1) of the first embodiment. FIG. 14 (2) is a sectional view taken along the line H-H in FIG. 14 (1). FIG. 14 (3) is a sectional view taken along the line J-J in FIG. 14 (2). The following description contains only differences from the above-mentioned embodiments and omits the duplication. The same parts are depicted by the same reference numerals.

The third embodiment provides an example of omitting the stopper and using one blind rivet as the stopper. According to the third embodiment as shown in FIG. 14, the long hole 30 is formed in the outer column 11 as long as a telescopic positioning range in the axial direction similarly to the first embodiment. The one first through-hole 123 is formed in the inner column 12. The one blind rivet 60 is inserted into the first through-hole 123 from the outer curved surface 112 of the outer column 11. Then, similarly to the first embodiment, a rivet tool is used to tighten the blind rivet 60 to the outer curved surface 121 of the inner column 12.

According to the third embodiment of the invention, the outer curved surface of the large-diameter disk-shaped head section 64 at the top end of the blind rivet 60 comes in contact with the inner surface of the long hole 30 in the vehicle length direction during the adjustment in the telescopic direction. In this manner, the telescopic stroke end of the inner column 12 is regulated against the outer column 11. Further, the outer curved surface of the head section 64 comes in contact with the inner surface of the long hole 30 in the vehicle width direction. In this manner, the relative rotation of the inner column 12 is regulated against the outer column 11. The third embodiment of the invention omits the stopper and therefore can reduce manufacturing costs. The long hole 30 can be short in the axial direction, making it possible to shorten the entire length of the steering device.

Fourth Embodiment

Figure 15:
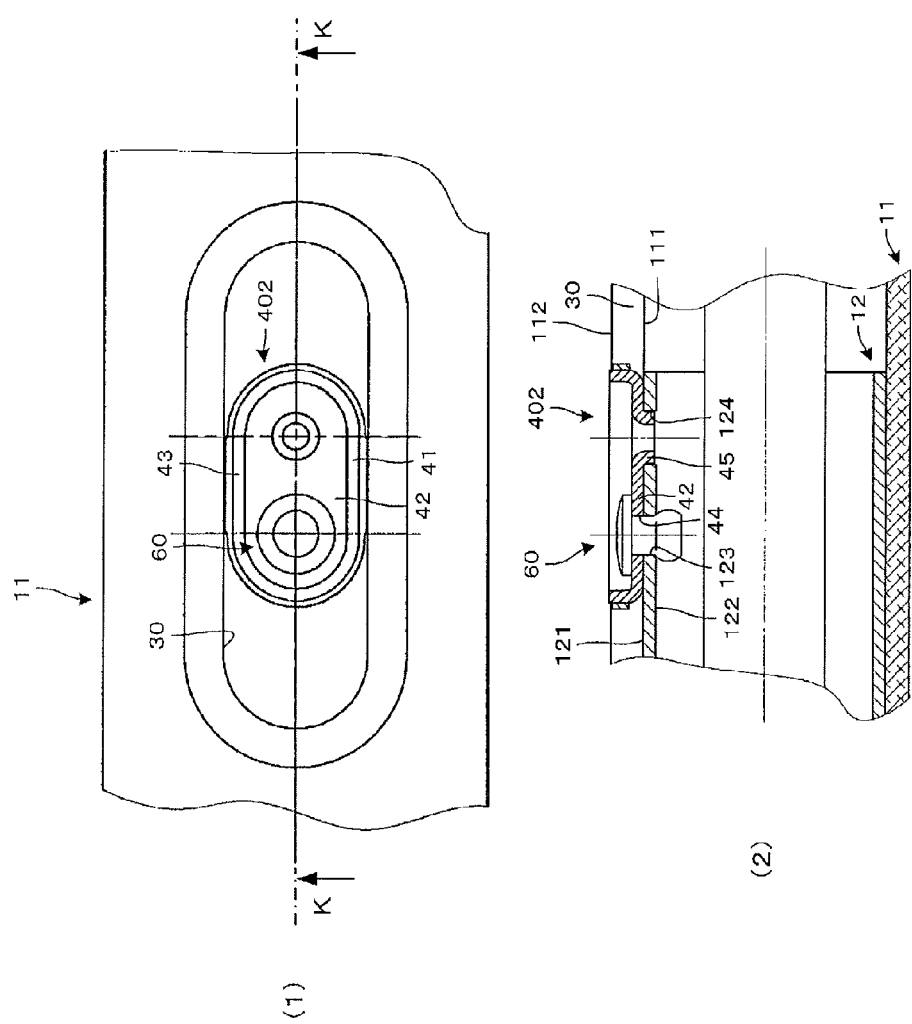
FIG. 15 shows a stopper according to a fourth embodiment of the invention, wherein FIG. 15 (1) is equivalent to FIG. 7 (1) of the first embodiment and FIG. 15 (2) is a sectional view taken along the line K-K in FIG. 15 (1)

The fourth embodiment of the invention will be described. FIG. 15 shows a stopper according to the fourth embodiment of the invention. FIG. 15 (1) is equivalent to FIG. 7 (1) of the first embodiment. FIG. 15 (2) is a sectional view taken along the line K-K in FIG. 15 (1). The following description contains only differences from the above-mentioned embodiments and omits the duplication. The same parts are depicted by the same reference numerals.

According to the fourth embodiment, the blind rivet fixes one of the two locations. The other location is fixed by burring the stopper. According to the fourth embodiment as shown in FIG. 15, the outer column 11 has the long hole 30 as long as a telescopic positioning range in the axial direction similarly to the first embodiment.

Similarly to the first embodiment, a stopper 402 includes the oval side plate 41 as a plan view and the bottom plate 42 for covering the bottom face of the side plate 41. The thin-plate slide member 43 is pressed and fixed around the side plate 41. The fourth embodiment forms two first through-holes 123 and 124 having different diameters in the inner column 12. One second through-hole 44 is formed in the bottom plate 42 of the stopper 40. Of the two first through-holes 123 and 124, the first through-hole 123 (to the left in FIG. 15) is formed to have the same diameter as the second through-hole 44. The other first through-hole 124 (to the right in FIG. 15) is formed to have a larger diameter than that of the first through-hole 123.

The one blind rivet 60 is inserted into the second through-hole 44 and the first through-hole 123 from the outer curved surface 112 of the outer column 11. Then, similarly to the first embodiment, a rivet tool is used to tighten the bottom plate 42 of the stopper 402 to the outer curved surface 121 of the inner column 12. The stopper 402 is burred to form a protrusion 45. The protrusion 45 is pressed into the first through-hole 124 in the inner column 12 to fix the bottom plate 42 of the stopper 402 to the outer curved surface 121 of the inner column 12.

Fifth Embodiment

Figure 16:
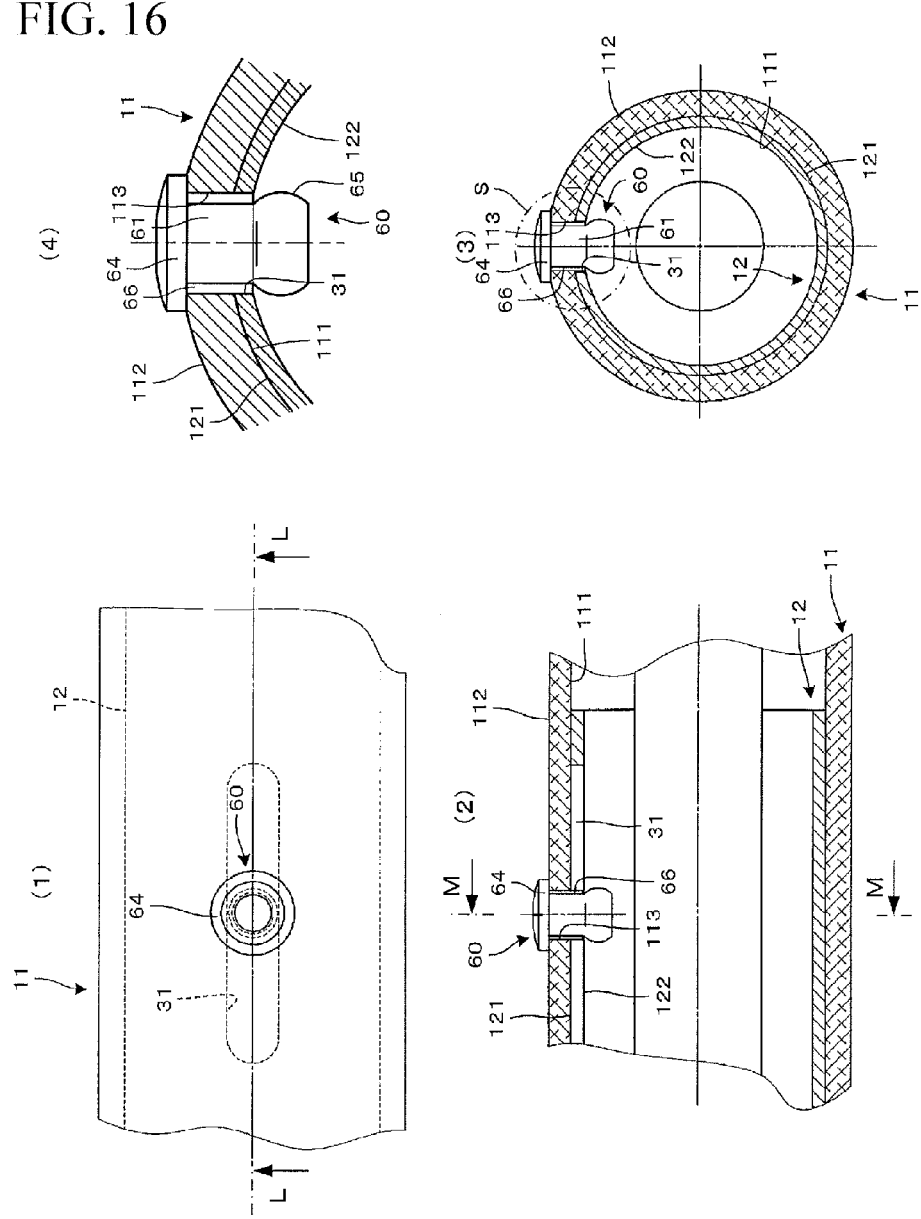
FIG. 16 shows a stopper according to a fifth embodiment of the invention, wherein FIG. 16 (1) is equivalent to FIG. 7 (1) of the first embodiment, FIG. 16 (2) is a sectional view taken along the line L-L in FIG. 16 (1), FIG. 16 (3) is a sectional view taken along the line M-M in FIG. 16 (2), and FIG. 16 (4) is an enlarged sectional view of portion S in FIG. 16 (3)
Figure 17:
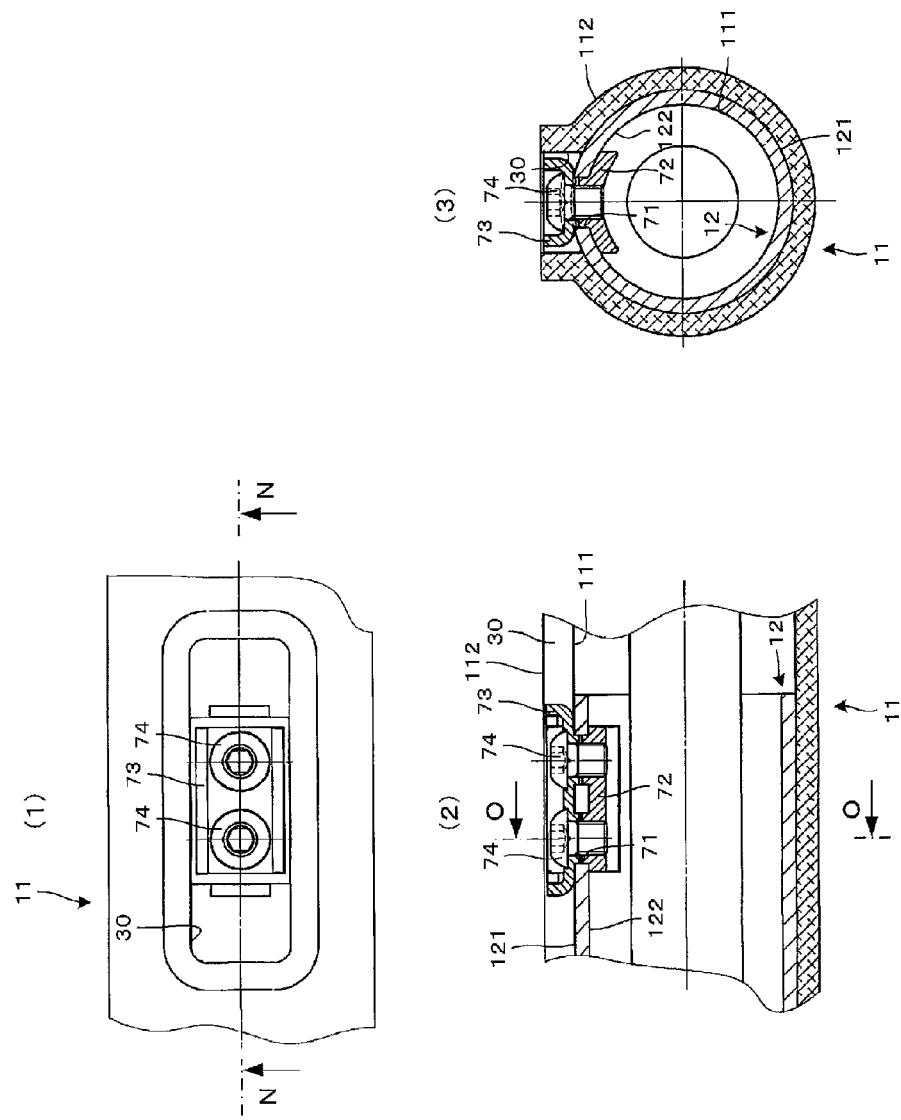
FIG. 17 shows a conventional stopper, wherein FIG. 17 (1) is a plan view, FIG. 17 (2) is a sectional view taken along the line N-N in FIG. 17 (1), and FIG. 17 (3) is a sectional view taken along the line O-O in FIG. 17 (2).

The fourth embodiment of the invention will be described. FIG. 16 shows a stopper according to a fifth embodiment of the invention. FIG. 16 (1) is equivalent to FIG. 7 (1) of the first embodiment. FIG. 16 (2) is a sectional view taken along the line L-L in FIG. 16 (1). FIG. 16 (3) is a sectional view taken along the line M-M in FIG. 16 (2). FIG. 16 (4) is an enlarged sectional view of portion S in FIG. 16 (3). The following description contains only differences from the above-mentioned embodiments and omits the duplication. The same parts are depicted by the same reference numerals.

The fifth embodiment provides an example of forming a long hole in the inner column, omitting the stopper, and using one blind rivet as a stopper. According to the fifth embodiment as shown in FIG. 16, the inner column 12 has a long hole 31 as long as a telescopic positioning range in the axial direction. One third through-hole 113 is formed in the outer column 11.

The one blind rivet 60 is inserted into the third through-hole 113 and the long hole 31 from the outer curved surface 112 of the outer column 11. The tip of the rivet 60 protrudes from the inner curved surface 122 of the inner column 12. A hollow and cylindrical spacer 66 is externally fitted to the cylindrical outer curved surface on the rivet body 61 of the blind rivet 60. The spacer 66 is made of iron and is formed with such an outside diameter as to fit into the third through-hole 113 while ensuring an appropriate gap. The outer curved surface of the spacer 66 may be covered with a resin indicating a small friction coefficient. The spacer 66 can slide along the inner surface of the long hole 31 with a small sliding resistance and smoothly and telescopically move the inner column 12 against the outer column 11.

Then, similarly to the first embodiment, a rivet tool is used to hold the mandrel (not shown) of the blind rivet 60 at the top end and pull up the mandrel. The bottom end of the rivet body 61 is bulged to form the spherically bulged section 65 and shorten the rivet body 61 in the axial direction.

As a result, the head section 64 and the bulged section 65 of the rivet body 61 clamps the outer curved surface 112 of the outer column 11 and the inner curved surface 122 of the inner column 12. The spacer 66 limits shrinkage of the rivet body 61 to a specified size in the axial direction so that the blind rivet 60 can apply a proper tightening force.

The fifth embodiment of the invention omits the stopper and therefore can reduce manufacturing costs. The long hole 30 can be short in the axial direction, making it possible to shorten the entire length of the steering device.

The above-mentioned embodiments have described the examples of applying the present invention to the tilt/telescopic steering device. The embodiments may be applied to a telescopic steering device only capable of adjusting telescopic positions.

DESCRIPTION OF REFERENCE NUMERALS

1—Column
2—Steering wheel
3—Steering shaft
4—Universal joint
5—Intermediate shaft
5a—Intermediate inner shaft
5b—Intermediate outer shaft
6—Universal joint
7—Steering gear
8—Tie rod
9—Front wheel
10—Steering device
11—Outer column
111—Inner curved surface
112—Outer curved surface
113—Third through-hole
12—Inner column
121—Outer curved surface
122—Inner curved surface
123, 124—First through-hole
23—Tilt bracket
23a—Upper plate
23b—Side plate
23c—Tilt positioning long groove
24—Mounting bracket
24a—Upper plate
24b—Side plate
24c—Lower plate
241c, 242c—Bolt hole
243c—Guide groove
24d—Bent portion
24e—Pivot pin
25—Column clamp member
25a—Side plate
25b—Through-hole
25c—Slit
27—Clamp unit (tilt/telescopic clamp unit)
27a—Tightening rod
271a—Male screw
27b—Stationary cam
27c—Movable cam
27d—Thrust bearing
27e—Operation lever
27f—Adjustment nut 271f—Female screw
28—Head section
281—Rotation stop section
29—Rotation stop section
30—Long hole
31—Long hole
40—Stopper
401—Stopper
402—Stopper
41—Side plate
42—Bottom plate
43—Slide member
44—Second through-hole
45—Protrusion
51—Reinforcing plate
511—Bolt hole
512—Tightening hole
52—Bolt
53—Bolt
54—Nut
55, 56—Low-friction plate
57—Reinforcing back plate
60—Blind rivet
61—Rivet body
62—Mandrel
63—Spherical section
64—Head section
65—Bulged section
66—Spacer
71—Long hole
72—Nut
73—Stopper
74—Bolt

The invention claimed is:

1. A steering device comprising:
    an inner column;
    a hollow outer column that has an inner curved surface around an outer curved surface of the inner column so as to be capable of telescopic positioning and rotatably supports a steering shaft fitted with a steering wheel;
    a clamp unit that contracts and expands the inner curved surface of the outer column to clamp and unclamp the outer curved surface of the inner column at a specified telescopic adjustment position;
    a long hole that is formed in the outer column as long as a telescopic positioning range in an axial direction and is bored from an outer curved surface of the outer column to the inner curved surface of the outer column;
    a first through-hole that is formed in the inner column and is bored from the outer curved surface to an inner curved surface of the inner column in a radial direction;
    a stopper made of metal provided for the long hole including a side plate and a bottom plate, wherein the side plate has an oval shape and wherein the bottom plate covers a bottom face of the side plate;
    a second through-hole that is formed in the stopper and approximates to the first through-hole in diameter and wherein the second through-hole is disposed within the oval shape of the side plate;
    a slide member made of resin, wherein the slide member is pressed and fixed around the side plate of the stopper and wherein a lateral surface of the slide member is in contact with an inner surface of the long hole; and
    a blind rivet with a disk-shaped head section that is inserted from the outer curved surface of the outer column into the second through-hole and the first through-hole, exposes a tip of the blind rivet from the inner curved surface of the inner column, and expands the tip into a spherical bulged shape to fix the stopper to the outer curved surface of the inner column by strongly pressing the tip against the inner surface of the inner column.

2. The steering device according to claim 1, further comprising a second blind rivet and wherein the stopper is fixed to the outer curved surface of the inner column by the blind rivet and the second blind rivet at two positions that are axially separated.

3. The steering device according to claim 1,
    wherein only one blind rivet is used.

4. The steering device according to claim 1,
    wherein the blind rivet is used to fix the stopper to the outer curved surface of the inner column at one of two positions that are axially separated; and
    wherein the stopper is burred to form a protrusion that is pressed into the inner column to fix the other of the two positions that are axially separated.

* * * * *